D. D. PARMELEE.
Apparatus for the Manufacture of Carbon-Bisulphide.
No. 206,477. Patented July 30, 1878.

Witnesses:
T. E. Brecht
John K. Hallowell

Inventor:
Dubois D. Parmelee

2 Sheets—Sheet 2.
D. D. PARMELEE.
Apparatus for the Manufacture of Carbon-Bisulphide.
No. 206,477. Patented July 30, 1878.
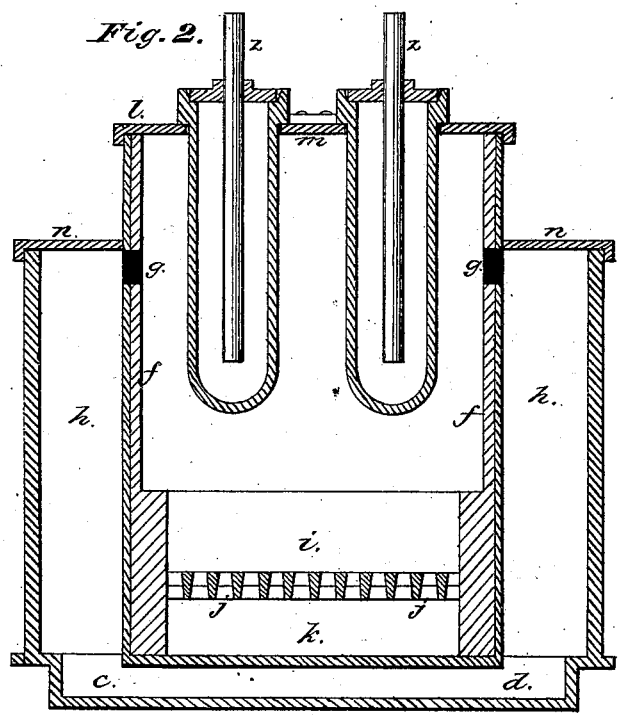
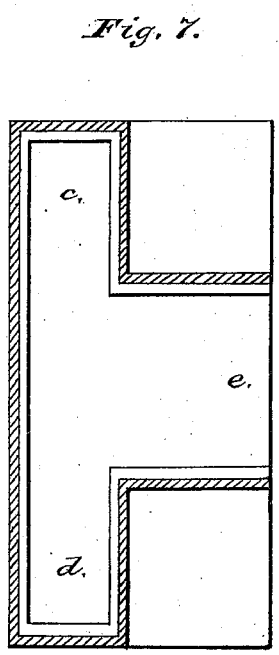
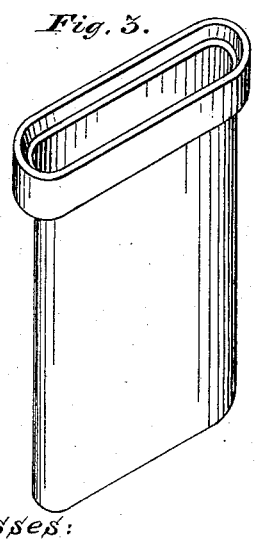
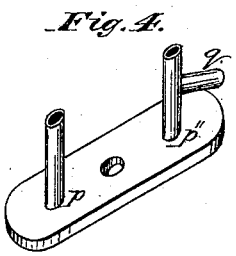
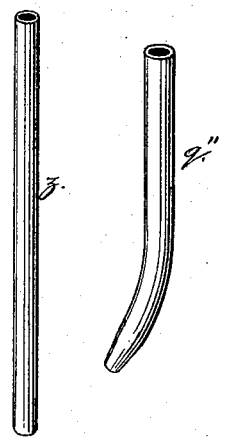
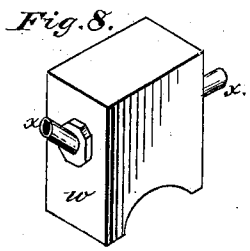
Witnesses:
F. C. Brecht
John K. Hallowell
Inventor
Dubois D. Parmelee

UNITED STATES PATENT OFFICE.

DUBOIS D. PARMELEE, OF NEW YORK, ASSIGNOR TO JOHN CHAPMAN, OF BROOKLYN, N. Y.

IMPROVEMENT IN APPARATUS FOR MANUFACTURE OF CARBON-BISULPHIDE.

Specification forming part of Letters Patent No. 206,477, dated July 30, 1878; application filed November 7, 1877.

*To all whom it may concern:*

Be it known that I, DUBOIS D. PARMELEE, of the city of New York, in the county of New York and State of New York, have invented certain new and useful Improvements in Apparatus for Making Bisulphide of Carbon; and I do hereby declare that the following is a full, clear, and exact description thereof, which will enable others skilled in the art to which it appertains to make and use the same, reference being had to the accompanying drawings, and to the letters of reference marked thereon, which form a part of this specification, in which—

Figure 1:
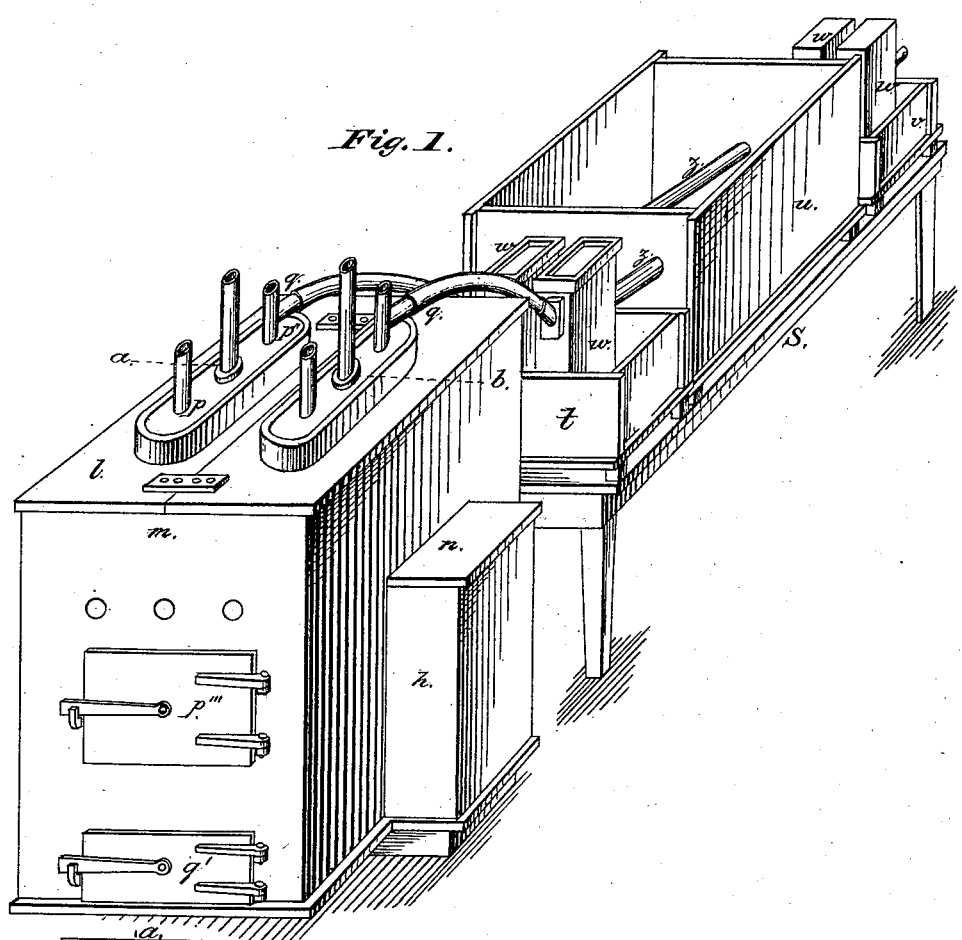
Figure 1A:
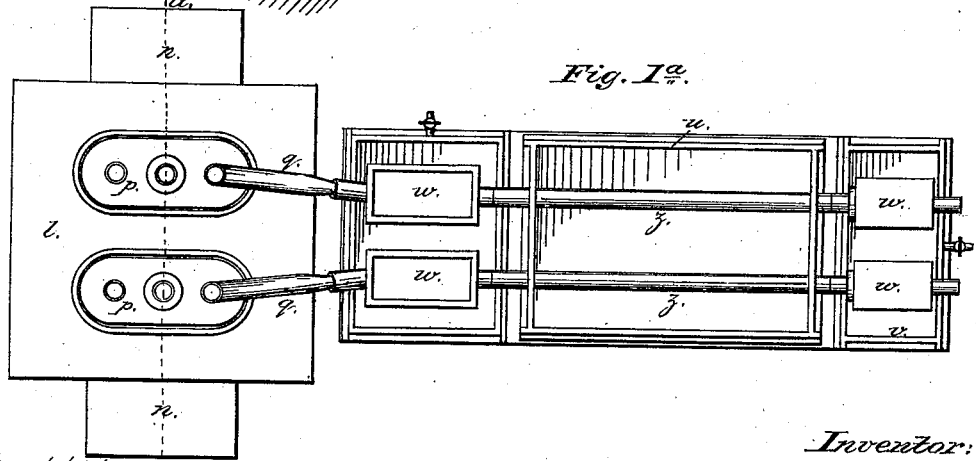

Figure 1 is an isometrical perspective of the furnace and condensing apparatus viewed from a point where the front and one side of the furnace are seen, and Fig. 1ª is a plan view of the same. Fig. 2 is a longitudinal cross-section of the furnace on the line $a\ b$, Fig. 1. Fig. 3 is an isometrical perspective of the retorts. Fig. 5 is one of the pipes for feeding the sulphur into the retorts. Fig. 6 shows the pipes leading from the lids of the retorts to the condensers. Fig. 7 is a plan view of the flue at the bottom and beneath the furnace. Fig. 8 shows the rectangular boxes of the condensing apparatus.

In constructing the furnace a wrought sheet-iron box is made by riveting together the edges so as to form the exterior shape of the furnace. The ground-flue is constructed in the foundation of the furnace, as shown at Fig. 7. The wrought sheet-iron shell is placed over the flue, so that it comes precisely in the center. Tiles of fire clay are then placed over the flue, so as to form a hearth for the ash-pit of the furnace, leaving at each end ($c\ d$, Figs. 7 and 2,) an opening corresponding to the flues to be constructed above them and leading to the fire-box. This part of the flue $e$ is covered with tiles, as is also the continuation of it to the stack or chimney, situated at any convenient distance from the furnace.

The wrought-iron shell is next lined with fire-bricks. A single tier is sufficient, as shown at Fig. 2, $ff$. An opening must be left at $g\ g$, leading to the flues $h\ h$. Within the lining is a second tier of fire-brick, forming the fire-box $i$ and ash-pit $k$. A triangular bar of iron is placed behind and in front, to support the grate-bars $j\ j$ above the ash-pit $k$. The next step is to cover the whole with a cast-iron cover or cap, $l$, which is about one inch thick, and in two sections, having two holes, through which to insert the retorts. To prevent the sections from spreading apart, they are strapped together by wrought-iron straps, bolted on with bolts and nuts, as shown at $m$. The flues $h\ h$ are also capped by cast-iron covers $n$. All the covers have flanges, which reach over the wrought-iron outer shell, binding it at every side and preventing it from warping.

There are two doors to the furnace, marked $p'''$ in the drawing for the fire-box, and $q'$ for the ash-pit. Above the fire-box are three "peep-holes," through which to observe at intervals the temperature of the retort, and to enable the attendant to regulate the fire.

The retorts are made of cast-iron, about thirty inches high, and internal dimensions of an ellipsis six by eighteen inches. The bottoms are round, presenting no angle at any point. At the top the retorts are a half-inch thick; at the bottom, one and a half inch thick. The increase in thickness is uniform from the top to the bottom.

Around the top of each retort is a flange projecting sufficiently to form a support for it on the cover of the furnace. The flange is also fitted to receive the lid and hold sufficient fire-clay cement to lute it gas-tight.

The retorts are hoisted above the furnace and lowered into the openings of the lid of the furnace by a tackle. Fig. 2 shows the order of their adjustment.

The pipe, Fig. 5, is next adjusted in the hole at center of the lid by passing it through until it reaches within four or five inches of the bottom of the retort, when the lids are placed on them. The pipe is held to its place in the lid by iron wedges, and made tight around, to prevent the escape of gas, by fire-clay cement. The tops of the pipes should extend about twenty inches above the tops of the lids.

There are two pipe-projections cast on the top of the lids, as shown at $p\ p''$, Figs. 1 and 4. The latter, $p''$, has branching from it, at right angles, another pipe, $q$, into which are inserted bent wrought-iron pipes, the form of which is shown by Fig. 6.

The foregoing completes the furnace. The following relates to the condensing apparatus attached to the furnace:

A table of suitable dimensions and strength is provided, as shown at S, Fig. 1. Three strong wooden boxes, $t\ u\ v$, Fig. 1, are placed on the table, in the order shown in the drawing. The length of the boxes $t$ and $v$ are the same as the width of the furnace. The width of these two boxes is two feet. Each is lined with sheet-lead, and their bottoms have an inclination to the sides farthest from the furnace of two inches, so that a liquid flows readily to those sides. At the bottom of these boxes are brass or other metal cocks for drawing off a liquid. The center box, $u$, is in width that of the furnace, while its length is from eight to ten feet, or more. It may be made water-tight by any of the usual modes of making wooden boxes hold water. The best manner is to calk the seams with oakum and then to coat the seams with pitch. In the boxes $t$ and $v$ are placed the rectangular boxes, as shown at W W W W, Figs. 1 and 8. There are two of these in each box. At each end of these rectangular boxes are projecting pipes $x$ $x$, Fig. 8. On one side of these boxes one end of the pipes is elevated to permit the insertion of the end of the pipe $q''$, Fig. 6. The other pipes, on the opposite end of the boxes, are inclined downward, to permit of their insertion into the lead pipes $z\ z$ passing through the long box $u$, and have an inclination sufficient to allow a liquid to easily flow through them. The rectangular boxes are made of galvanized iron, soldered gas-tight, and may be made of uniform dimensions. Their bottoms are open and their sides arched at the bottom, as shown in Fig. 8. Their tops have a strip of metal soldered around them about three inches high, forming a basin for holding water to keep them cool. The dimensions of the galvanized-iron boxes should not be less than eighteen inches high and six inches by one foot in the other measurements.

The pipe $q''$ leading from the retort to the first condensing-boxes, Fig. 6, should have a caliber of not less than two and a half inches. The lead pipes of the long box, $u$, should be made of pipe light in weight, and have a caliber of not less than two inches. The pipe for feeding the sulphur into the retorts, Fig. 5, should be of cast-iron one-half inch thick, and have a caliber of not less than one and a half inch. The short pipe-projections cast with the lids of the retorts for feeding the charcoal into them should have calibers of not less than two and a half inches.

When all the parts have been adjusted as described, the connections of the pipes must be made gas-tight by strips of muslin coated with moist blue clay wound around the joints, the three wooden boxes are nearly filled with water, and the retorts are filled to within four or five inches of the lids with charcoal, which has been broken into pieces averaging from the size of a grain of wheat to that of a hickory-nut. The charcoal is poured through the pipes $p\ p''$ in the lids by means of a funnel. When the retorts have been charged as described, and the charcoal uniformly spread into all parts of the retorts by an iron rod, the feed-pipes are closed with cast-iron stoppers luted with fire-clay. A wooden stopper is inserted in the pipe for feeding the sulphur.

The fire is now kindled in the furnace and the retorts heated to a glowing red heat. When this has been attained granulated sulphur is fed into the retort through the pipe at the center by means of small tin cups holding about three ounces of sulphur each. At each addition of sulphur the stoppers of wood are quickly removed, and after the sulphur is passed in they are as quickly closed. These charges of sulphur may be added every two minutes when the retorts are at the proper temperature for working to the best advantage. The sulphur falls through the pipes to the bottom of the retorts, where it is converted into gas, which rises through the interstices or spaces between the pieces of charcoal, and combines with the red-hot charcoal, thus forming bisulphide of carbon, also a gas, which passes off through the pipes $q\ q$ to the rectangular galvanized-iron condensers W W, where a considerable portion of it is condensed to a liquid, which, being nearly one and a half times as heavy as water, sinks to the bottom of the lead-lined box $t$, from which it is drawn off by a cock, as previously described. That portion not condensed passes off through the long lead pipes of the box $u$, which condenses the remaining portion, and it flows into the galvanized boxes at the farther ends of these pipes, and falls through the water to the bottom of the lead-lined box, as in the other case, from which it is drawn off by a cock at the bottom.

The last galvanized-iron condensing-boxes serve not only as condensers, but also, as I have found in practice, to prevent explosions when the operation is brought to a close. Without these boxes, on the cooling of the retorts, the atmospheric air is drawn in, and, mixing with the uncondensed bisulphide of carbon while there is sufficient heat in the retorts to ignite such a mixture, produces an explosion. In such cases the condensers are bursted. For the purpose of entire safety the condensers should be made of wrought metal, which will rip or tear in place of breaking into fragments, as is the case where cast-iron or other brittle or fracturable material is used for the purpose.

Explosions do not occur with this apparatus if it is adjusted so that there is no leakage or cracks to allow air to enter in when the retorts are cooling down; and even in this case the explosions are of so mild a character that no injury can occur to the attendant.

The operation is repeated by allowing the fire to the furnace to run down and waiting about two hours. Then the iron stoppers of the feed-pipes are removed one at a time and the retort recharged with charcoal, when the fire is again elevated and the operations repeated, as before.

During the process some crystallized sulphur will accumulate in the first condensing-box. This may be removed by slightly hammering on the condenser, which will jar it off, and it will fall to the bottom of the water, and may be removed, if in sufficient quantity to require it, by the hand of the operator.

The bisulphide of carbon drawn from the boxes is of a straw-yellow color, in consequence of its holding from five to ten per cent. of sulphur in solution. It is distilled in any suitably-shaped wrought or cast iron still by heating the still by steam or by a water-bath heated by a coil through which the water circulates, placed in a distant furnace or stove. Bisulphide of carbon, being very volatile, should not be collected or distilled near a fire. After distillation it is either transparent or a little milkish. In either case it should be copiously washed with water by agitation. It will thus be rendered perfectly transparent and sufficiently pure for commercial purposes. When it is required for prisms, or to be nearly inodorous, it is still further treated by methods well known and practiced by chemists.

The manufacture is greatly facilitated by having the charcoal perfectly burned and dry, as in case of imperfectly-burnt coal some naphtha will be formed, and when it is damp large volumes of sulphide of hydrogen are formed. Some sulphide of hydrogen, however, is always formed. This should be led out of the building by a pipe attached to the last condensing-box, or lime-water may be used to neutralize it.

Apparatus of the dimensions I have described requires about ten hours to "run off" a charge, and about one hundred and thirteen pounds of sulphur for the two retorts. The services of one man and a boy assistant are required. The retorts will form about two thousand pounds of bisulphide of carbon each before they will require to be changed. When they have become useless they are broken into pieces. The bisulphide and protosulphide of iron formed on the inner side shell off easily. This is all converted into protosulphide of iron for technical purposes. The part of the retort not converted into a sulphide is remelted and cast into other retorts. The sulphur separated from the bisulphide of carbon by distillation, and also that crystallized in the condensers, is dried, granulated, and fed into the retorts with other sulphur.

The man who feeds the sulphur in the retorts sits in a chair on a wood platform at the side of the furnace and even with the top of it. This platform is reached by a step-ladder.

One of the great advantages of this system of condensing is the accessibility of all its parts for the removal of crystallized sulphur. This is not true of any other system I am acquainted with. The straight lead tubes may be swabbed out with a straight rod having a brush on the end of it. This cannot be done where a worm is used. Those condensers where drums are employed, placed one over the other and connected together by hollow pipes, which serve the double purpose of passages and supports, are not accessible on the interior. I have found such condensers to invariably explode.

My improvements have grown out of lengthy and expensive experience in the manufacture of bisulphide of carbon.

The furnace heats the retorts uniformly. They therefore last much longer. The lids are permanent fixtures. No explosions occur; and as a whole the apparatus is cheap and efficient.

Having thus described my invention, what I claim as new and of my invention is—

1. In an apparatus for condensing vapors of carbon-bisulphide, the combination of the rectangular boxes $t$, $u$, and $v$, condensers W, and the tubes $z$, passing through the intermediate box $u$ at an inclination and connecting the condensers, substantially as described.

2. The combination of the furnace with its retorts and heating-flues, the rectangular condensers, the intermediate box $u$, and tubes $z$, all substantially as set forth.

In testimony that I claim the foregoing as my own I affix my signature in presence of two witnesses.

DUBOIS D. PARMELEE.

Witnesses:
JOHN A. BASSETT,
JOHN K. HALLOWELL.